United States Patent [19]

Bonneville

[11] Patent Number: 4,934,939
[45] Date of Patent: Jun. 19, 1990

[54] METHOD OF TEACHING BED-MAKING

[76] Inventor: Jeffrey H. Bonneville, 1842 E. Lomita, Orange, Calif. 92667

[21] Appl. No.: 276,534

[22] Filed: Nov. 28, 1988

[51] Int. Cl.⁵ .............................................. G09B 19/00
[52] U.S. Cl. ..................................... 434/247; 434/433; 5/485
[58] Field of Search .................... 434/433, 247; 5/485, 5/42

[56] References Cited

U.S. PATENT DOCUMENTS 3,654,646  4/1972  McMahon, Jr. ........................ 5/485

Primary Examiner—Edward M. Coven
Assistant Examiner—Valerie Szczepanik

[57] ABSTRACT

This invention discloses an educational bed-making kit for teaching children to properly miter the corners of articles of bedding such as bedsheets, and a method of producing such a kit. The kit includes a bedsheet and an instruction book. The bedsheet is marked with various animal figures which the child uses to align the bedsheet on a mattress, to miter the corners of the bedsheet, and to tuck the bedsheet under the mattress. A head alignment mark indicates to the child where to align the bedsheet with the head of the mattress, and a plurality of side alignment marks indicate to the child how to center the bedsheet on the mattress. A corner lift mark shows the child where to lift the bedsheet near a corner to initiate the miter, and a miter corner mark shows the child when the bedsheet is properly lifted. A miter corner tuck mark shows the child where to tuck the corner of the bedsheet under the mattress, and a foot tuck mark shows the child where to tuck the foot of the bedsheet under the mattress. The instruction book guides the child through the steps of making the bed, by explaining what to do with each of the marks.

6 Claims, 4 Drawing Sheets

METHOD OF TEACHING BED-MAKING

FIELD OF THE INVENTION

The present invention relates to apparatus for teaching children to make a bed. More particularly, the present invention relates to educational kits for teaching children how to properly miter the corners of an article of bedding such as a bedsheet.

DESCRIPTION OF THE PRIOR ART

Modern man frequently sleeps on beds which have a mattress and a box spring foundation. To keep warm, he covers himself on this bed with sheets and blankets, which he leaves on the bed when he arises for the day. In order to give a neat, orderly appearance to the bed during the day, until he sleeps in it again, he may fold the sheets and blankets around the mattress in a precise manner giving the sheets and blankets what are known as mitered corners. Because he does this for his own bed, he desires that his children do so for their beds. The prior art bedding systems are little help to children in this matter, as they consist generally of sheets and blankets which are printed in solid colors or meaningless patterns, leaving the child to try to perform the mitering procedure from memory.

Thus, a need is seen to exist for a means of teaching and motivating children to make their beds in a mitered corner manner that has been accepted by society, which manner may be useful later in life in a regimented environment such as in the armed forces where mitered corner bed making is the norm.

It is therefore a primary object of the present invention to provide a means of instructing a child in the art of properly mitering the corners of an article of bedding used in making a bed.

It is also an object of the present invention to provide an article of bedding that is adapted with educational markings that aid a child in understanding where folds have to be made to properly form a mitered corner when making a bed.

It is yet another object of the present invention to provide an instructional booklet that complements educational markings provided on an article of bedding that are used during making a bed having mitered corners.

Still another object of the present invention is to provide a method of producing an education bed making kit that includes bedding material and instructional material that instructs a child on how to make a bed having mitered corners.

SUMMARY OF THE INVENTION

The present invention provides children with a bedsheet which is printed with meaningful, explanatory markings, and also provides an instruction booklet which guides the child through the mitering procedure. By reading through the booklet and following the simple directions it contains, the child will properly miter the corners of the bedsheet. The markings are attractive to the child, as they are friendly-looking animal figures. The directions are easy for the child to follow, as they simply direct him or her in how to align the bedsheet, where to lift and where to stop lifting the bedsheet to begin forming the mitered corner on the bed and where and how to tuck the animals into place on the mattress.

As is apparent, such a kit may be designed for use by people other than children, and may employ markings other than the animal figures, without departing from the apparatus or method of the present invention. For example, the markings may consist simply of dotted lines, and the instructions may be printed directly on the bedsheet rather than in a separate booklet.

Therefore, to the accomplishments of the foregoing objects, the invention consists of the foregoing features hereinafter fully described and particularly pointed out in the claims, the accompanying drawings and following disclosure describing in detail the invention, such drawings and disclosure illustrating, however, but one of the various ways in which the invention may be practiced.

DESCRIPTION OF THE PREFERRED EMBODIMENT

Figure 1:
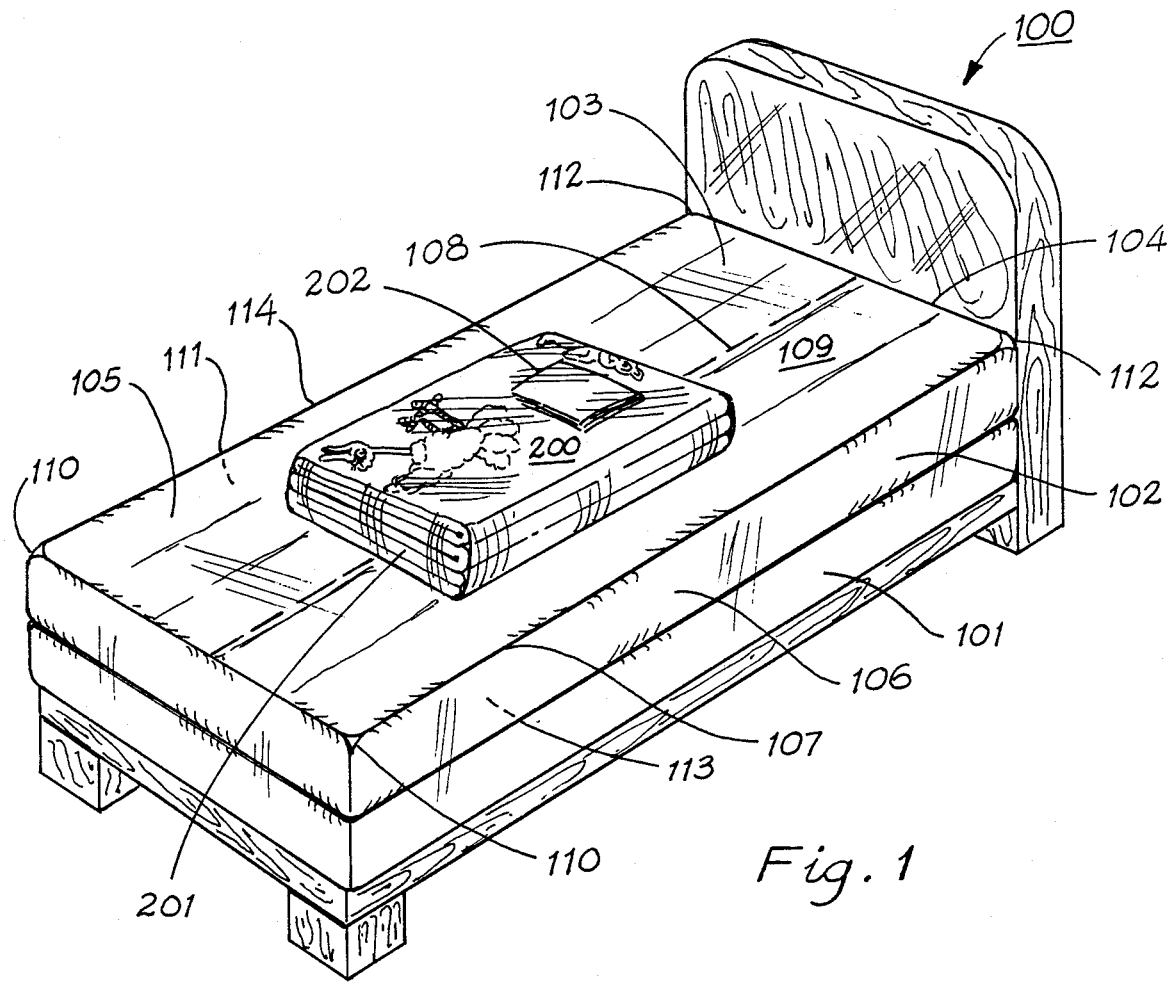
FIG. 1 illustrates the educational kit of the present invention, and specific portions of a bed associated with the present invention.

Referring now to FIG. 1, the present invention discloses an educational kit 200 for teaching a child C (see FIG. 2) to properly miter the corners of his or her bedding when making a bed 100. The educational kit 200 is intended for use with bed 100 which consists essentially of a mattress 102 and a box spring foundation 101 upon which the mattress 102 rests. It is not essential to the practice of the present invention whether a box spring foundation 101 or other type of foundation is used.

The mattress 102 has a head 103, a foot 105, a first and a second side 106 and 111, a top and a bottom surface 109 and 113, and foot corners and head corners 110 and 112. The head 103 has an edge portion 104, and the first and second sides 106 and 111 have edge portions 107 and 114, respectively. Because the mattress is substantially bilaterally symmetrical about an imaginary centerline 108 which runs from the head 103 to the foot 105, the left/right choice of which side 106 or 111 is to be the first side 106 and which is to be the second side 111 is irrelevant. The educational kit 200 contains an article of bedding 201 which is similarly symmetrical, and an instruction means 202 which explains the use of the article of bedding 201.

Figure 2:
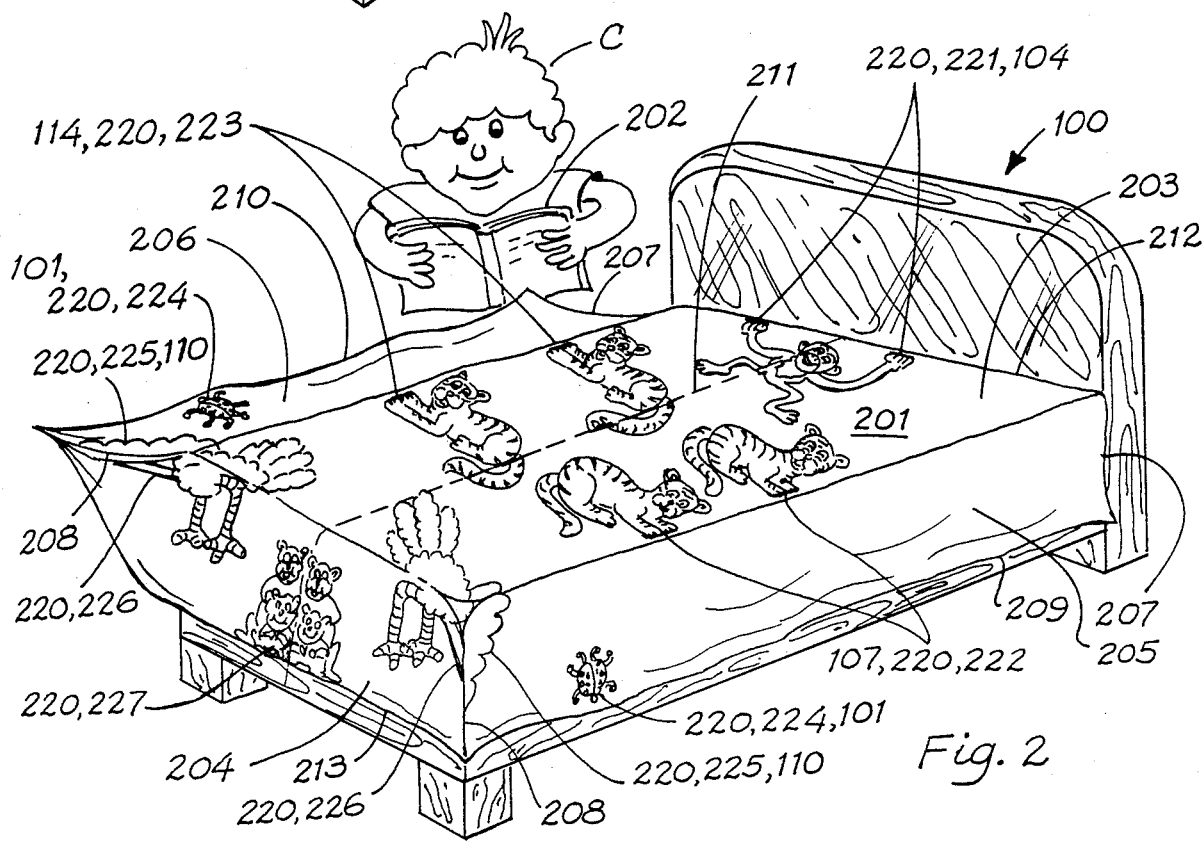
FIG. 2 illustrates a child reading the instruction booklet, and the educational markings on the article of bedding, and the proper alignment of the head and side alignment marks with the edge portions of the head and sides of the mattress.

FIG. 2 illustrates the article of bedding 201 which, in the best contemplated mode of practicing the present invention, happens to be a bedsheet, hereinafter also referred to by reference number 201. The bedsheet 201 has a head portion 203, which has a head edge member 212 and corner members 207. The bedsheet 201 also has a foot portion 204, which has a foot edge member 213 and corner members 208. The bedsheet 201 has side portions 205 and 206 each having a first side edge member 209 and a second side edge member 210, respectively. The bedsheet 201 is bilaterally symmetrical about an imaginary centerline 211 which runs from the head portion 203 to the foot portion 204. The bedsheet 201 is adapted with a plurality of educational marks, generally designated 220, that facilitate making the bed 100 by properly aligning the bedsheet 201 on the mattress 102 and by properly mitering the corner members 208. It is understood that although the bedsheet 201 of the present invention facilitates the mitering of the corner members 208 of the foot portion 204 only, and not of corner members 207 of the head portion 203, the process and apparatus for mitering the corner members 207 of the head portion 203 would be virtually identical to those disclosed herein, and only a mirror image of the present invention. The present invention discusses a bedsheet 201 which is a topsheet, but the same process could be used to miter all four corners of a bottomsheet. Furthermore, it is understood that the present invention may be practiced on a blanket, bedspread, or other article of bedding, and the illustration of a bedsheet 201 is merely for convenience.

Figure 3:
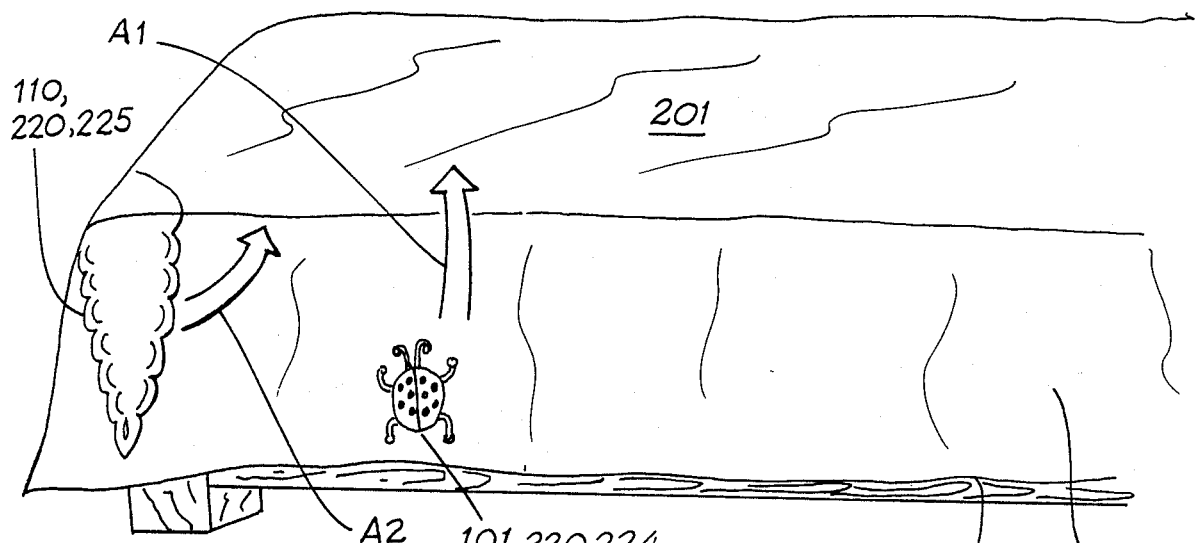
FIG. 3 illustrates a corner lift mark, a miter corner mark means, the motion of lifting the corner lift mark and the resulting motion of the miter corner mark that will begin the process of forming a mitered corner on a bed.

Continuing with FIG. 2, the instruction means 202 shows a child C how to begin to make the bed 100 by aligning a head alignment mark means 221 with the edge portion 104 of the head 103 of the mattress 102. In the best contemplated mode, the head alignment mark means 221 comprises the finger tips of upraised hands of a stylized monkey figure. The head alignment mark means 221 is placed near, and parallel to, the head edge member 212 of the bedsheet 201. The instruction means 202 directs a child C to make the head alignment mark means 221 meet the edge portion 104 of the head 103 of the mattress 102. Next, the instruction means 202 directs a child C to align a side alignment mark means 222 with the edge portion 107 of side 106 of the mattress 102. In the best contemplated mode, the side alignment mark means 222 comprises the outstretched front paws of a plurality of stylized tiger figures. The side alignment mark means 222 are placed parallel to a first side edge member 209 of the side portion 205 of the bedsheet 201, but sufficiently far away from the first side edge member 209 to allow some overhang of the bedsheet 201 over the side 106 of the mattress 102. The instruction means 202 directs a child C to make the side alignment mark means 222 line up with the edge portion 107 of side 106 of the mattress 102. The final step in aligning the bedsheet 201 on the mattress 102 is simply a mirror image of the previous step, but involves aligning a second side alignment mark means 223 with the edge portion 114 of the second side 111 of the mattress 102. The second side alignment mark means 223 comprises a second plurality of tiger paws. The first and second side alignment mark means 222 and 223 are placed in substantial bilateral symmetry about the imaginary centerline 211 of the bedsheet 201. This facilitates aligning the centerline 211 of the bedsheet 201 with the centerline 108 of the mattress 102. If the mattress 102 happens to be slightly wider or narrower than the distance between the first and second side alignment mark means 222 and 223, then this substantially bilaterally symmetrical alignment of the bedsheet 201 and the mattress 102 may be had by simply adjusting the bedsheet 201 on the mattress 102 until the first and second side alignment mark means 222 and 223 are equally distanced from their respective edge portions 107 and 114 of the first and second sides 106 and 111 of the mattress 102. Having thus properly aligned the bedsheet 201 on the mattress 102, a child C moves on to the mitering steps in the instruction means 202. FIGS. 2 and 3 illustrates the positioning of a corner lift mark means 224 and a miter corner mark means 225 when the bedsheet 201 is aligned as described above. In the best mode contemplated by the inventor, the corner lift mark means 224 is a stylized ladybug figure, and the miter corner mark means 225 is the outstretched wing of an ostrich. The corner lift mark means 224 is placed on the bedsheet 201 along the first side edge member 209 of the side portion 205, near a corner member 208 of the foot portion 204. When the bedsheet 201 is properly aligned on the mattress 102, the corner lift mark means 224 is below the mattress 102, roughly even with the box spring foundation 101. The miter corner mark means 225 is placed on the bedsheet 201 near a corner member 208 and perpendicular to the first side edge member 209. It is positioned so that when the bedsheet 201 is properly aligned with the mattress 102, the base of the miter corner mark means 225 is substantially directly upon the foot corner 110 of the mattress 102. Thus, when a child C lifts the corner lift mark means 224 with motion A1, the miter corner mark means 225 pivots about the foot corner 110 with motion A2.

Figure 4:
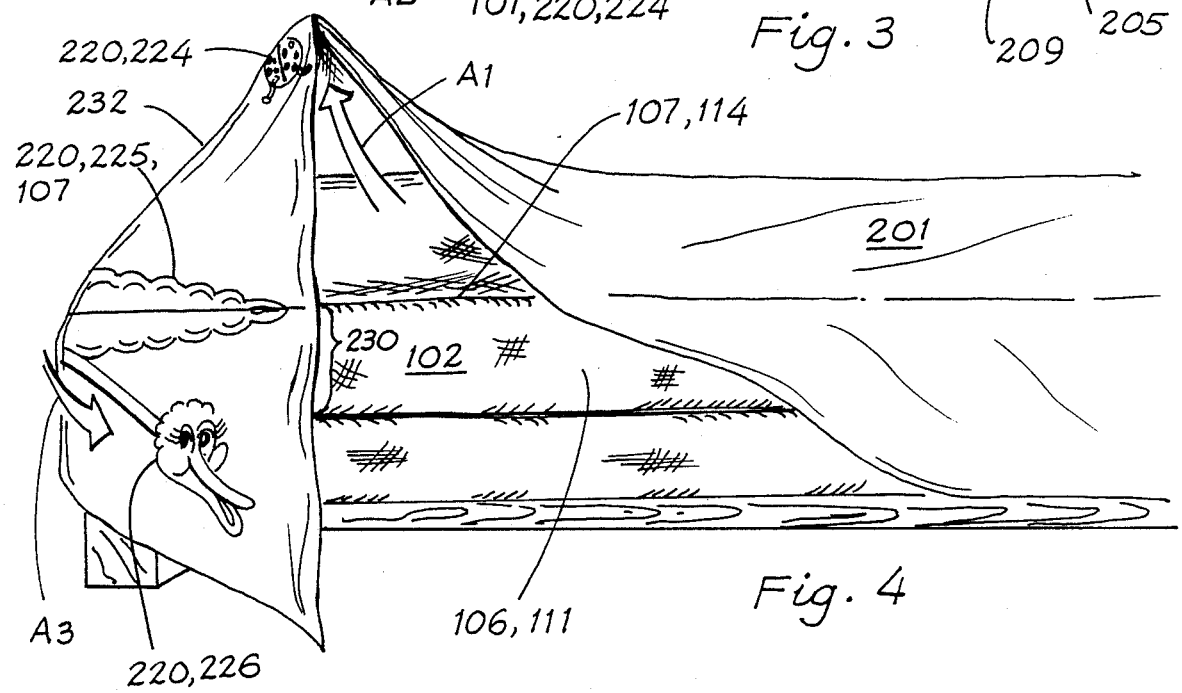
FIG. 4 illustrates initiating mitering of one corner member of the foot portion of the article of bedding through the proper lifting of a corner lift mark and the resulting proper alignment of the miter corner mark with an edge portion of a side of the mattress and exposing a miter corner tuck mark.

FIG. 4 shows the bedsheet 201 with the corner lift mark means 224 lifted and the miter corner mark means 225 pivoted. When a child C has lifted the corner lift mark means 224 to the correct height, the miter corner mark means 225 becomes a horizontal fold portion substantially parallel with and substantially upon the edge portion 107 of the first side 106 of the mattress 102. With the miter corner mark means 225 in this position, the corner member 208 of the foot portion 204 of the bedsheet 201 has folded around the foot corner 110 of the mattress 102 with motion A3 exposing a miter corner tuck mark means 226 that was previously overlaped at the foot of the bed (see FIG. 2) and also locates a corner section 230 and an unlocated miter corner section 232.

Figure 5:
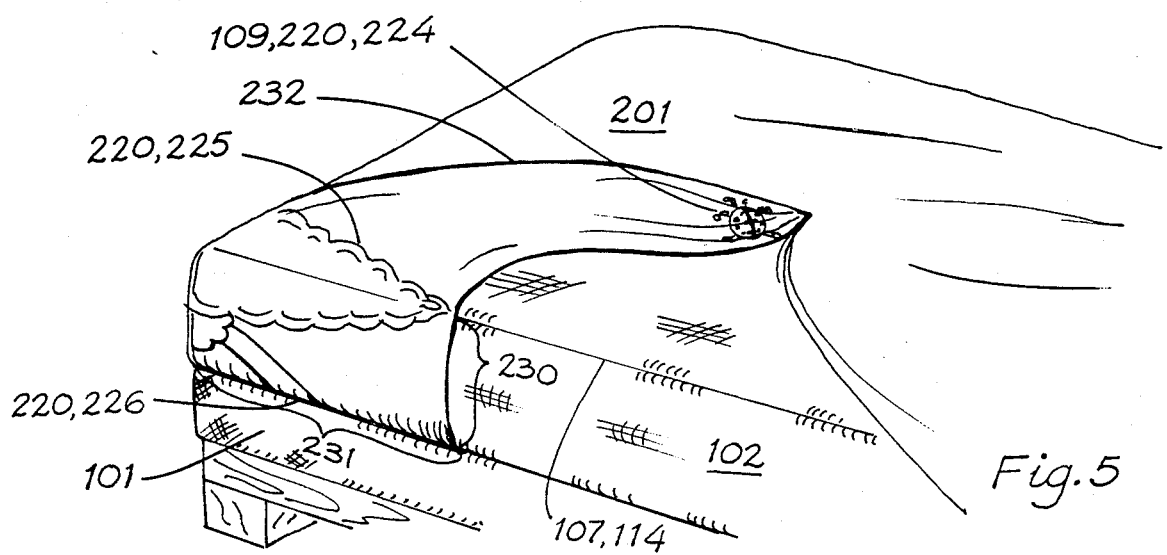
FIG. 5 illustrates a corner member of the foot portion of the article of bedding with the miter corner tuck mark tucked, forming a lower portion of a mitered corner joint.

Referring now to FIG. 5, a child C is then directed by the instruction means 202 to lay the corner lift mark means 224 on top 109 of the mattress 102. A child C is then directed to tuck a miter corner tuck mark means 226 between the mattress 102 and the box spring foundation 101. This creates a second corner section 231. In the best mode contemplated, the miter corner tuck mark means 226 is the lowered head of the same stylized ostrich figure whose outstretched wing comprises the miter corner mark means 225.

Figure 6:
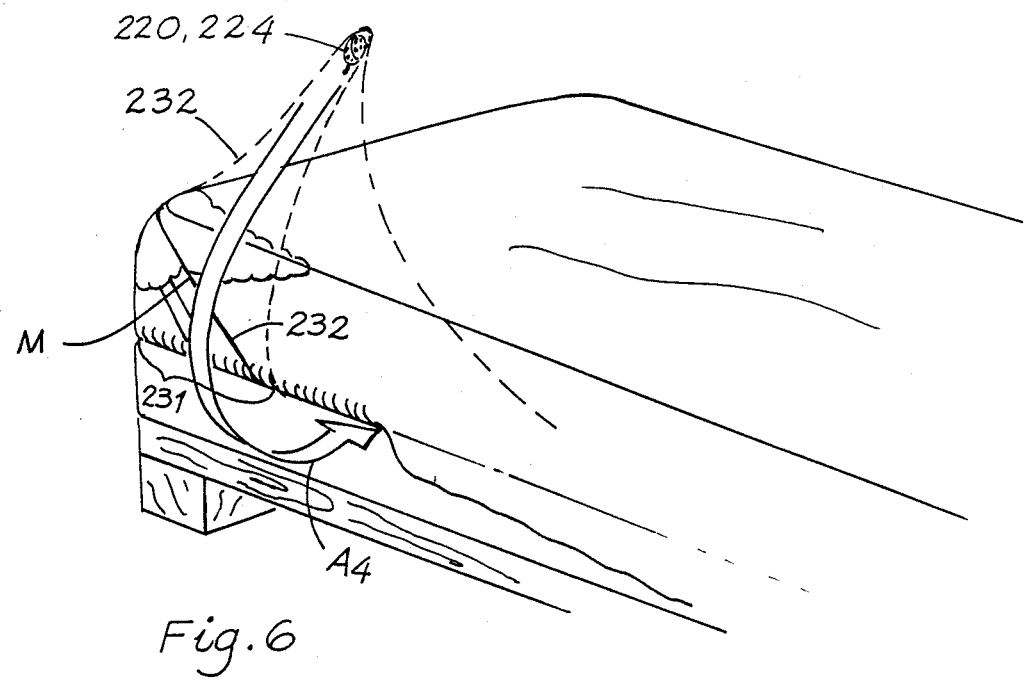
FIG. 6 illustrates the formation of an upper portion of the mitered corner joint by lowering and tucking the corner lift mark.

Referring now to FIG. 6, to finalize the mitered corner, a child C is directed to tuck the corner lift mark means 224 between the mattress 102 and the box spring foundation 101 with motion A4. This motion bring the miter corner section 232 and forms a miter corner joint M with the rest of the tucked bedsheet.

Figure 7:
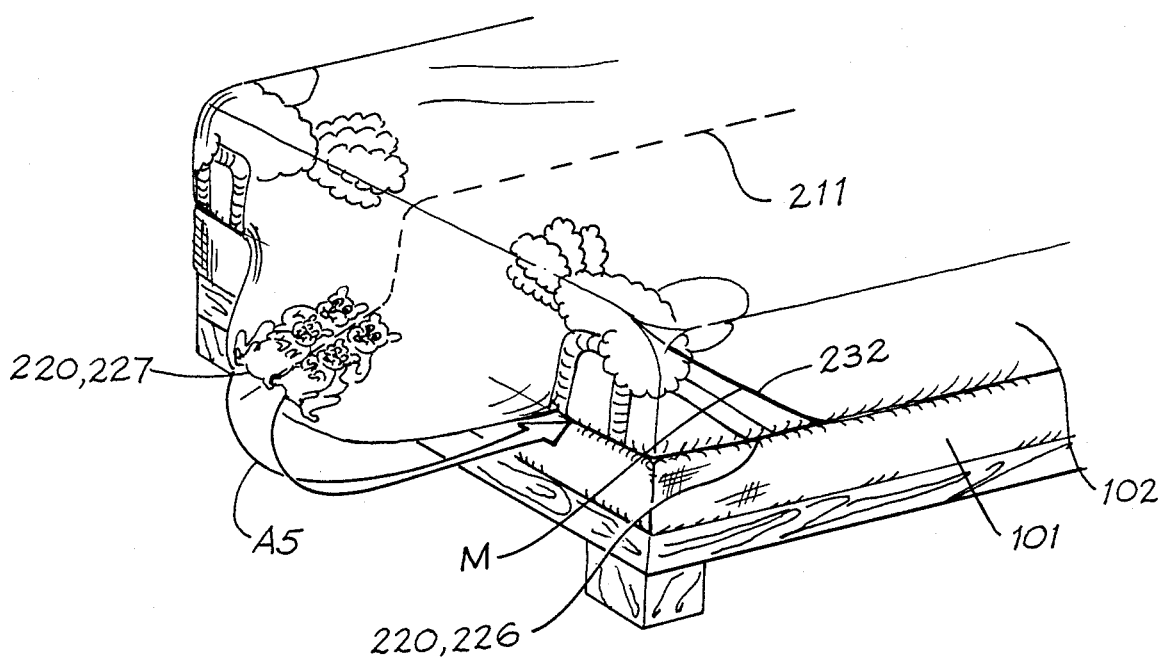
FIG. 7 illustrates the foot portion of the bed after properly forming the miter corners of both corner members of the foot portion and the required tucking motion of a foot tuck mark.

After mitering all corner members 208 of the foot portion 204, and corner members 207 if appropriate, of the bedsheet 201, all that remains for a child C to do is to tuck in the foot and side portions 204, 205 and 206. FIGS. 2 and 7 illustrates a foot tuck mark means 227, which a child C is directed to tuck between the mattress 102 and box spring foundation 101 with motion A5. In the best mode contemplated, the foot tuck mark means 227 comprises a plurality of groundhogs. The foot tuck mark means 227 is placed near the foot edge member 213 of the bedsheet 201, roughly centered on the centerline 211 so that the foot tuck mark means 227 does not get tucked under the mattress 102 during the mitering procedure. The foot tuck mark means 227 is positioned so that when the bedsheet 201 is properly aligned and mitered on the mattress 102, the foot tuck mark means 227 hangs entirely below the mattress 102. Thus, when a child C tucks the foot tuck mark means 227 under the mattress 102, the foot tuck mark means disappears from sight, as shown in FIG. 8.

Figure 8:
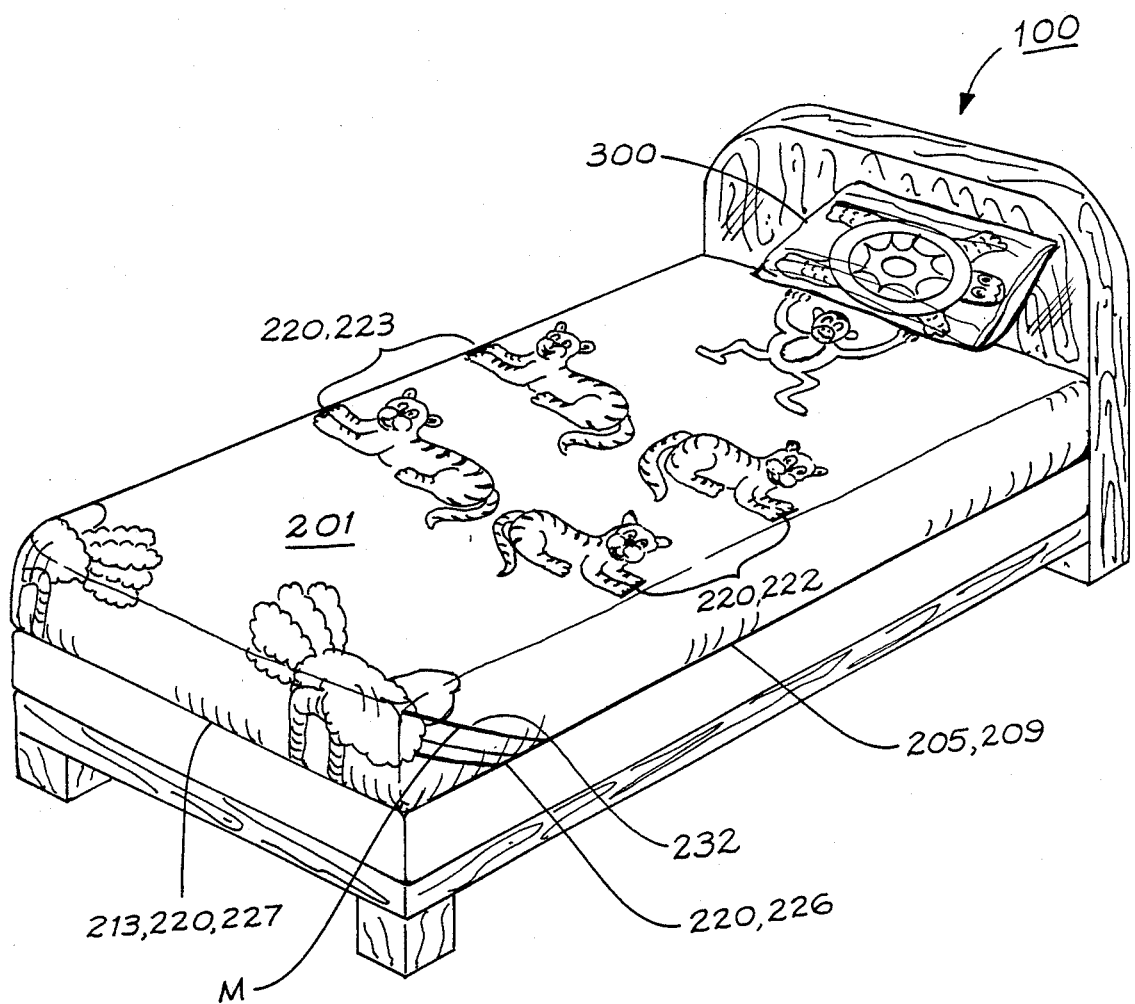
FIG. 8 illustrates a bed made with the educational material of the present invention.

As is best seen in FIG. 8, in completing the task of making a bed having mitered corners M, a child C merely tucks the first and second side edge members 209 and 210 of the side portions 205 and 206 of the bedsheet 201 under the mattress 102, and to place his or her pillows 300 on the mattress 102. Although the instruction means 202 teaches a child C how to do these tasks, they are not illustrated in the figures.

Therefore, while the present invention has been shown and described herein in what is believed to be the most practical and preferred embodiments, it is recognized that departures can be made therefrom within the scope of the invention, which is therefore not to be limited to the details disclosed herein but is to be accorded the full scope of the claims so as to embrace any and all equivalent apparatus.

I claim:

1. A method of teaching bed-making, said method comprising the steps of:
    (a) providing an article of bedding with a plurality of reference marks that facilitate the making of a bed, said marks comprising at least one corner lift mark means for initiating formation of a mitered corner joint, at least one miter corner mark means for properly aligning a horizontal fold portion of said mitered corner joint with an edge portion of the side of a mattress provided on said bed and at least one miter corner tuck mark means for properly forming a lower portion of said mitered corner joint; and
    (b) providing an instructional means for interpreting and using said plurality of reference marks.

2. The method of claim 1 further comprising the step of:
    providing said at least one article bedding with at least one head alignment mark means for placing and aligning said head portion of said at least one article in parallel alignment with an edge portion of said head of said mattress.

3. The method of claim 2 further comprising the step of:
    providing said at least one article of bedding with a first side alignment mark means for placing and aligning of a side edge member of said article of bedding in parallel alignment with an edge portion of said first side of said mattress.

4. The method of claim 3 further comprising the step of:
    providing said at least one article of bedding with a second side alignment mark means for placing and aligning of a second side edge member of said article of bedding in parallel alignment with an edge portion of said second side of said mattress, said first and second side alignment mark means being placed in substantial bilateral symmetry about said centerline of said at least one article of bedding such that alignment of each of said side alignment mark means with its respective side of said mattress brings said at least one article of bedding into substantial bilateral symmetry with said mattress.

5. The method of claim 4 further comprising the step of:
    providing said at least one article of bedding with at least one foot tuck mark means for properly tucking said foot portion of said article of bedding between said foot of said mattress and said box spring foundation.

6. The method of claim 5 wherein:
    (a) said at least one corner lift mark means comprises a stylized ladybug;
    (b) said at least one miter corner mark means comprises an outstretched wing of a stylized ostrich;
    (c) said at least one miter corner tuck mark means comprises a lowered head of said ostrich;
    (d) said head alignment mark means comprises fingertips of a stylized monkey's hands;
    (e) said first and second side alignment mark means comprise: paws of a plurality of stylized tigers; and
    (f) said at least one foot tuck mark means comprises: a plurality of groundhogs.

* * * * *